April 21, 1970     N. A. HANA     3,507,042
COLOR MATCHING SYSTEM FOR TEETH
Filed April 14, 1969
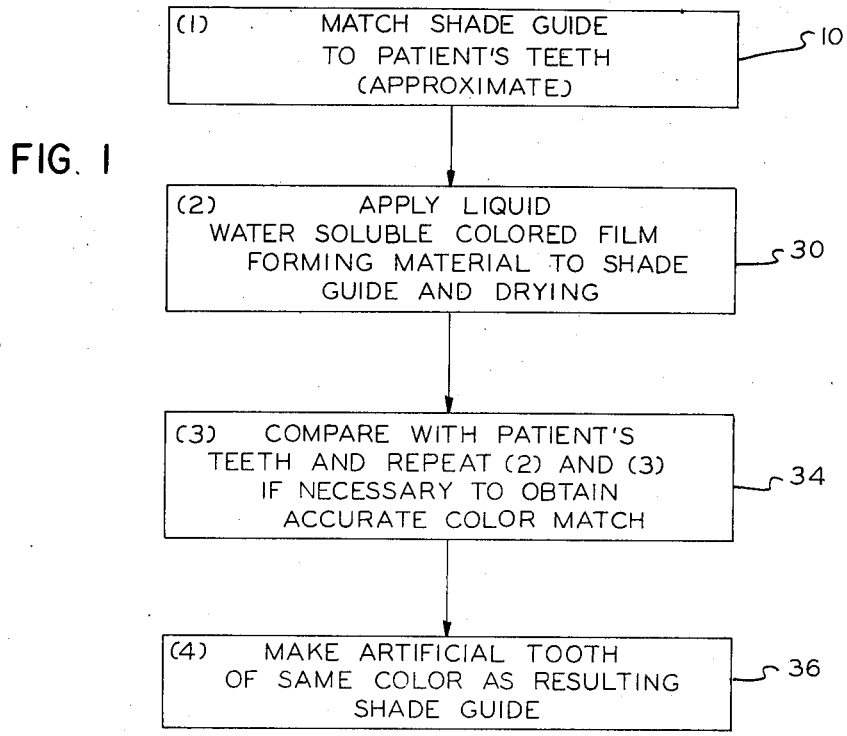
FIG. 1
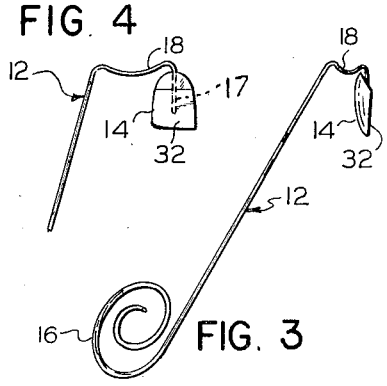
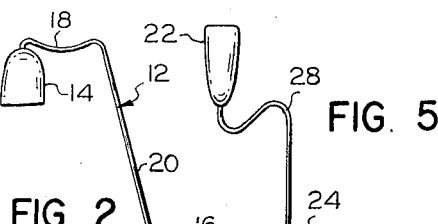
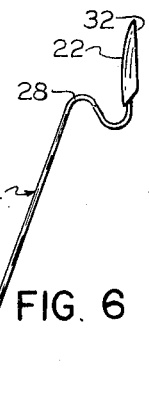
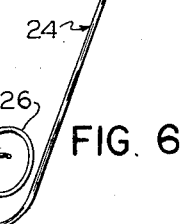
NORMAN A. HANA
*INVENTOR*
BY
BUCKHORN, BLORE, KLARQUIST & SPARKMAN
*ATTORNEYS*

United States Patent Office 3,507,042
Patented Apr. 21, 1970

3,507,042
COLOR MATCHING SYSTEM FOR TEETH
Norman A. Hana, Vancouver, Wash., assignor to Dahlin Dental Laboratory, Portland, Oreg., a corporation of Oregon
Filed Apr. 14, 1969, Ser. No. 815,627
Int. Cl. A61c 19/00
U.S. Cl. 32—71                                              7 Claims

ABSTRACT OF THE DISCLOSURE

A method of making artificial teeth of the correct color to match a patient's teeth is disclosed in which a shade guide in the form of an artificial tooth having a shade approximating the desired shade is brought to such desired shade by comparison with the teeth of the patient following the application of a transparent water soluble colored film from a set of liquid film forming materials having pigments dispersed in a water miscible liquid medium to provide a coating which remains water soluble. The resulting colored shade guide is preserved and employed as a guide for making one or more artificial teeth of the correct color for incorporation, for example, in a bridge or a partial or complete denture.

BACKGROUND OF INVENTION

One of the major problems in making artificial teeth for such products as bridges, or partial or complete dentures has been the matching of the color of a patient's natural teeth. While the colors of teeth appear to range from a light almost white tan to a light brown, the fact is that the colors involved may contain a small amount of nearly any color of the visual spectrum and even slight variation in color becomes apparent when artificial teeth are positioned closely adjacent natural teeth. Also natural teeth as well as properly made artificial teeth are to some extent translucent so that the color of the back of a tooth, particularly the back of the lower part or incisal portion of a tooth may be as important as the color of the front or normally exposed portion of a tooth.

In order to attempt to specify the color of a given tooth of a patient so that a dentist himself, or his technician, or more usually technicians in a commercial laboratory specializing in the making of artificial teeth can later make a properly colored artificial tooth, the dentist has employed a series of shade guides which can be purchased by a dentist or are furnished to dentists by commercial laboratories. These shade guides are in the form of artificial teeth and usually come in sets of 12 to 15. The shade guides of these sets grade in color from the very light tan to the light brown referred to above. The dentist holds different shade guides in proximity to a patient's tooth to be matched and selects the guide which in his opinion most closely approximates the color of the tooth.

If an acceptable match could always be made with one of the shade guides, this would be completely satisfactory. It has been found impractical, however, to provide the required number of shade guides to match all natural teeth so that very seldom is the closeness of matching sufficient to satisfy a discriminating patient. As a result the dentist decides that the artificial tooth needs to be a little more blue or a little more red or brown than the selected shade guide and writes a color prescription for use by himself, or his technician, or by a technician in a commercial laboratory. It has also not been found possible to provide numerical standards for such prescriptions and a direction to make the artificial tooth a little more blue than the shade guide selected or any similar language is extremely indefinite. In the first place the prescription is based on a guess by the dentist as to what the required modifying color should be and the color of the artificial tooth is based on another guess by the maker of this tooth as to what the prescription means. This is true even of the dentist himself, if he actually makes the artificial tooth, since it is unlikely that his memory of the color of the natural tooth will be accurate.

The procedure above described has resulted in a very large number of dentures, bridges and the like being rejected by patients on the basis of failure to match his natural teeth with consequent extensive monetary losses to the dentist or to the dental laboratory.

The situation described above has existed for a large number of years, going back to almost the inception of modern dentistry. Thus the situation arose as soon as it became possible to make natural appearing artificial teeth of ceramic porcelain or of plastic. The techniques of duplicating the color of an actual sample, such as the color of a specific shade guide, have become highly developed and are well known to dental technicians, but despite the evident need for some process for enabling artificial teeth to be more accurately matched in color with the patient's teeth, no satisfactory process has heretofore been provided.

SUMMARY

The present invention does provide a simple and effective process for overcoming the difficulties above discussed. In accordance with the invention, the dentist can add the required color to a shade guide to make it closely match a natural tooth or even an existing artificial tooth of a patient. Thus each dentist can have available a set of liquid colored film forming materials. Such a set, for example, can contain liquids forming transparent films having the substractive primary colors as well as one or more other colors, such as brown. Such a set will also usually contain a supply of a similar liquid for forming a clear film and one for forming a white translucent or opaque film. The liquids referred to can be of a type which rapidly dries to a thin adherent gloss film and this dry film as well as the liquids themselves can be water soluble.

By applying a film of one color or a mixture of colors including white, particularly in conjunction with the use of the clear film forming material as a diluent, any color can be added to the surface of the shade guide. This film application can be done, for example, by using a small brush in conjunction with a small ceramic pallet for color mixing.

Repeated comparisons of the colored shade guide with the tooth to be matched can be made and changes made in the colored coating until a satisfactory match is obtained. Dry films which are too dark can be lightened by brushing with the clear liquid to remove a portion of the film, or films which are too light can be darkened by brushing on more color, or changed by brushing on an additional color. It has been found that dentists rapidly develop skill in applying the correct colored coatings.

The comparing of the colored shade guides with teeth in a patient's mouth is facilitated by special shade guide holders which hold the lips of the patient out of the dentist's line of sight and at the same time are capable of being heat sterilized along with the shade guides themselves. The colored coating can be removed from the shade guides at any time by simple rinsing in water.

The coated and matched shade guides can be employed by the dentist himself at a later time or by a dental technician, either in the employment of the dentist or of a commercial dental laboratory to make artificial teeth of the correct shade. Rejection of such teeth by the patient because of incorrect color are substantially eliminated.

It is therefore an object of the invention to provide an improved process of producing artificial teeth which are accurately matched in color or shade with a patient's existing teeth.

BRIEF DESCRIPTION OF DRAWINGS

FIG. 1 is a flow diagram showing the various steps of the preferred embodiment of the invention;

FIG. 2 is a front elevation of a preferred form of shade guide and holder for color matching of the shade guide with an upper tooth of a patient;

FIG. 3 is a side elevation of the device of FIG. 2;

FIG. 4 is a fragmentary back elevation showing a portion of the device of FIGS. 2 and 3;

FIG. 5 is a front elevation of a shade guide and holder for color matching of the shade guide with a lower tooth of a patient; and FIG. 6 is a side elevation of the device of FIG. 5.

DESCRIPTION OF THE PREFERRED EMBODIMENT

As indicated by block 10 of FIG. 1, one of a set of commercially available shade guides is selected by approximate matching with one or more teeth of a patient. This matching is facilitated by employing one of the shade guide holders of FIGS. 2 to 6. If the tooth is an upper tooth, the shade guide holder 12 for a shade guide 14 simulating such a tooth is effectively employed. The holder 12 is made of a single piece of stiff wire of corrosion resistant metal having a handle 16 formed by bending an end of the wire into a spiral or other suitable shape, which can be grasped between the thumb and forefinger of the hand of the dentist. The shade guide 14 has a hole 17 drilled longitudinally of the guide to receive a reversely bent portion of the other end of the wire. This end of the wire can be frictionally retained in the hole in the shade guide, or any other suitable detachable fastening arrangement can be employed to hold the shade guide 14 on the holder 12.

The shade guide has a substantially horizontally extending portion 18 extending from the shade guide 14 to a substantially straight shank 20 extending at a convenient angle downwardly to the handle 16. The portion 18 can be employed to lift a portion of the upper lip of the patient while the shade guide 14 is placed in alignment with and closely adjacent the tooth to be matched. This portion 18 may have a slight curve which is concave upwardly to assist in holding the upper lip out of the line of sight of the dentist.

A similar shade guide 22 simulating a lower tooth supported on a similar holder 24 can also be effectively employed. The holder 24 may have a handle portion 26 similar to the handle portion 16 of the device of FIGS. 2 to 4, and may also have a horizontally extending curved portion 28 for holding the lower lip of the patient out of the line of sight of the dentist when the shade guide 22 is positioned in alignment with and closely adjacent a lower tooth of a patient.

It will be apparent that the shade guides 14 and 28 may be removable from their holders as above described so that the two types of holders shown in FIGS. 2 to 6 can be employed with a set of detachable shade guides, or that the shade guides of a set may each be permanently attached to a holder which can be of metal or any other suitable material. In any event the holders and shade guides can all be heat sterilized between uses.

When an approximately matching shade guide has been selected from a set of shade guides, it can be brought to an accurately matching color by applying colored films of liquid film forming material, as indicated in block 30 of FIG. 1. This can be accomplished by brushing one or more films of suitable colored film forming liquid materials on one or more surfaces of the selected shade guide.

As an example, a suitable liquid film forming material may be of the same general type as so-called water thinned oil or resin paints. That is to say, they may consist of finely divided pigments suspended in a film forming vehicle including one or more volatile solvents for the vehicle. This mixture is in turn colloidally suspended as extremely fine droplets in an aqueous medium usually containing a water missible volatile liquid by the use of dispersing and emulsifying agents. The major difference between film forming materials suitable for use in the present invention and the water thinned resin paints is that the pigments and vehicle therefor form a glossy transparent or semitransparent film except that any white pigment employed forms an opaque or translucent film and the emulsifying or dispersing agents are of a type which do not evaporate or are otherwise rendered inactive upon drying of the film forming material. Thus the dried films remain dispersible in water so that they can be easily rinsed from a shade guide even after standing in a dried condition. The term "water soluble" material as used in this application is therefore employed in a non technical sense to mean any substance which mixes rapidly with water to produce either a true solution or a colloidal solution.

Also in this application the word "color" refers to both hue and saturation in the sense that any change in either hue or saturation of the colors is considered to be a change of the color. The color of the dry films produced by applying the liquid materials above discussed can thus be changed by either mixing two of the liquids individually producing films of different hues but of the same saturation, or by diluting any of the liquids or mixtures to reduce the color saturation of the resulting film.

In addition to having available a suitable set of shade guides, the dentist will have a set of suitable colored liquid film forming materials usually contained in a series of similar vials supported in a suitable holder. An adequate set to produce any required color will include separate liquid materials of the type above described which form films having the subtractive primary colors, namely red, yellow and blue, upon drying. A liquid film forming material drying to a brown color is also useful. All of such materials are of a type which form transparent glossy films when dry. Such a set will also include a material which will form a similar opaque or translucent white film when dry, as well as a supply of clear liquid film forming material, all of such liquid materials being water soluble materials in that they are miscible with water in liquid form and dry to films which are easily dispersible in water and can be rapidly rinsed from a shade guide. Different colored films can thus be superimposed and the clear film forming material can be employed to partly dissolve and partly remove a previously applied and dried film to lighten or reduce the color saturation of such film.

The dentist rapidly learns which colors are required to convert the color of a shade guide which approximately matches a given tooth into a shade guide colored to accurately match such tooth. He finds that he can even duplicate teeth having different shades on different portions of the tooth surface and that the desired match sometimes requires the application of relatively dark films of various colors, such as blue or red, to the rear surface of a shade guide and particularly the incisal portions 32 of the teeth 14 and 22 shown in FIGS. 2, 3, and 6. As the liquid colored materials dry quickly he can repeatedly make comparison with the tooth or teeth to be matched, as indicated in block 34 of FIG. 1, and can lighten, darken or change the color of the shade guide until an accurate match is obtained. Thus the colors can be mixed or diluted on a very small area of a ceramic pallet using a small paint brush and the resulting mixtures modified as the matching operation proceeds. With a minimum of experience, dentist can usually obtain such a match in a few minutes.

When a suitable match of the color of a patient's tooth is obtained, the colored shade guide can be preserved indefinitely until the correctly colored artificial tooth or teeth have been made as indicated in block 36 of FIG. 1. If necessary, a plurality of colored shade guides matching different teeth of a patient can be made and employed to make artificial teeth for the patient. When the artificial teeth have been thus made, the colored shade guides can be easily cleaned by washing in water and can then be sterilized and reused.

As indicated above the techniques of making either ceramic or plastic artificial teeth to match a shade guide of any color likely to be found on natural teeth are fully developed and known to dental technicians and need not be further described.

I claim:

1. The method of making artificial teeth having a color matching the color of a patient's tooth, which comprises:
   applying to a surface of a selected shade guide in the form of an artificial tooth having a color approximating the color of said patient's tooth a coating of a rapidly drying liquid film forming material producing upon drying a water soluble gloss film of a selected color and drying said coating;
   comparing the color of the resulting shade guide with the color of said tooth of the patient by supporting said colored shade guide in close proximity to said tooth of said patient;
   repeating said applying and drying of a liquid film forming material and comparing the color of the resulting shade guide with said tooth of the patient until a satisfactory matching of the resulting color of the shade guide and said tooth of the patient is obtained;
   and making an artificial tooth having the color of said resulting shade guide.

2. The method in accordance with claim 1 in which the repeated applying of a liquid film forming material includes the application of a clear film forming liquid material to dissolve and remove a portion of a previously applied and dried film.

3. The method in accordance with claim 1 in which the colored film forming materials dry to produce transparent colored films.

4. The method in accordance with claim 1 in which at least one of said liquid film forming materials dries to a white at least partly opaque film.

5. The method in accordance with claim 3 in which a plurality of layers of said film forming materials are applied to produce superimposed films of different colors.

6. The method in accordance with claim 1 in which a plurality of said liquid film forming materials of different colors are mixed in order to produce a film of a desired color.

7. The method of claim 1 in which a holder for said shade guide formed to hold a lip of the patient out of the line of sight of a dentist is employed to position said shade guide in close proximity to said tooth of a patient.

References Cited
UNITED STATES PATENTS

| | | | |
|---|---|---|---|
| 1,246,999 | 11/1917 | Pinches | 32—71 |
| 1,582,122 | 4/1926 | Clapp | 32—71 |
| 2,343,777 | 3/1944 | Lays | 32—71 |

ROBERT PESHOCK, Primary Examiner